United States Patent [19]
Johnson et al.

[11] Patent Number: 5,964,839
[45] Date of Patent: Oct. 12, 1999

[54] SYSTEM AND METHOD FOR MONITORING INFORMATION FLOW AND PERFORMING DATA COLLECTION

[75] Inventors: Charles George Johnson, Lilburn, Ga.; Bernard S L Renger, New Providence, N.J.

[73] Assignee: AT&T Corp, Middletown, N.J.

[21] Appl. No.: 09/085,482

[22] Filed: May 27, 1998

Related U.S. Application Data

[63] Continuation-in-part of application No. 08/625,607, Mar. 29, 1996, Pat. No. 5,878,384.

[51] Int. Cl.[6] .................................................. G06F 15/173
[52] U.S. Cl. .......................... 709/224; 709/223; 702/187
[58] Field of Search .................................... 702/179, 187, 702/188; 395/200.3, 200.47, 200.49, 200.5, 200.54, 200.53, 680, 683, 681, 835; 709/200, 217, 219, 220, 224, 223, 300, 303, 301; 712/35

[56] References Cited

U.S. PATENT DOCUMENTS

| | | | |
|---|---|---|---|
| 5,032,979 | 7/1991 | Hecht et al. | 364/222.5 |
| 5,488,409 | 1/1996 | Yuen et al. | 348/5 |
| 5,497,479 | 3/1996 | Hornbuckle | 463/29 |
| 5,590,056 | 12/1996 | Barritz | 702/186 |
| 5,613,089 | 3/1997 | Hornbuckle | 711/164 |
| 5,675,510 | 10/1997 | Coffey et al. | 709/224 |
| 5,878,384 | 3/1999 | Johnson et al. | 702/187 |

OTHER PUBLICATIONS

NPD Group, various internet web pages located at "http://www.npd.com/", 1997.
"Nielsen–like Service Monitors Internet Surfers" Newsbytes News Network, Jul. 14, 1995.
"PC–Meter Now in 1,000 Households Nationwide", PR Newswire, Nov. 20, 1995.
Frook, "Net Tracking on the PC", Communications Week, Apr. 1, 1996.

*Primary Examiner*—Ellis B. Ramirez
*Assistant Examiner*—William Titcomb

[57] ABSTRACT

A system and method for the monitoring and collection of all inbound/outbound information activity and communications activity at a particular user location, for example, a household equipped with a variety of devices having communication capabilities. The real-time interaction between a user and an external information service is monitored and specific data are collected regarding that real-time interaction. Connectivity data (e.g., date/time of interactive session, number of packets sent/received, application file name) are collected. In addition, other substantive data (e.g., type of service, type and number of inquiries made) regarding the real-time interaction are collected. A connectivity and desktop activity monitor comprises a set of client software modules, including executable files and virtual device drivers that capture and log targeted operating system modem connectivity and desktop activity data. The connectivity monitor includes a connectivity infiltration module (CIM) and a connectivity monitor interface program. The CIM functions as a stub module that monitors the bi-directional data stream at the virtual device driver level between software modules of the operating system. It utilizes the hooking functions provided by the operating system to set hooks for selected function calls from the application to the communications drivers. The desktop activity monitor includes a desktop infiltration module and a desktop monitor interface program which monitor activity from the keyboard and pointing devices used to interface with the client computer. The invention provides the capability to monitor a number of attributes at the data stream level in a bi-directional, real-time fashion. With regard to the connectivity data monitor, such attributes include the phone number dialed, data packets sent, bytes sent, data packets received, bytes received, the URL visited and the recognition of an outgoing fax call. With regard to the desktop activity monitor, such attributes include the length of time an application is active, resident in memory, inactive or suspended.

43 Claims, 3 Drawing Sheets

SYSTEM AND METHOD FOR MONITORING INFORMATION FLOW AND PERFORMING DATA COLLECTION

CROSS-REFERENCE TO RELATED APPLICATION

This application is a continuation-in-part of application Ser. No. 08/625,607, filed on Mar. 29, 1996, now U.S. Pat. No. 5,878,384, Mar. 2, 1999, the subject matter of which is hereby incorporated by reference in its entirety.

FIELD OF THE INVENTION

The present invention relates to data collection and, more particularly, to a data monitoring and collection system.

BACKGROUND OF THE INVENTION

Recent trends in personal computing, data communications, on-line services, computer hardware and application program software have transformed the ordinary household into a hotbed of information and communication activity. Increasingly, individuals have computers, facsimile machines, modems, entertainment centers, cable ready televisions and multiple telephones all located in their households for facilitating a variety of communications. Due to the increased usage of such devices in the household, many product retailers and service providers are interested in, and assign great value to, the collection of data representing the usage habits of individuals at the household level. For example, market researchers target the collection of data to aid in the evaluation of the effectiveness of alternative forms of television commercials.

The prior art is replete with various systems and arrangements for monitoring the viewing habits of television viewers. Early systems collected data at a given viewer site for later manual collection. Such manually collected data included, for example, identification of television channels viewed and the times of viewing for various panels of viewers in order to determine market share and ratings of various television programs. Later systems were designed for use with cable television systems which have two-way communications over the cable system between the head end of the system and various cable subscribers. In this type of system, the television sets themselves are periodically contacted from the central location over the cable connection, with the channel selection and time information being sent back to the central location. Other prior art systems incorporate storage devices (e.g., memory) at the remote location for accumulating the relevant viewing data over time. The accumulated data is then periodically transmitted over conventional telephone lines from the remote locations to the central location by telephone calls initiated by either the remote stations or the central location itself.

In the past, systems for remotely accumulating data regarding the habits of television viewers and their qualitative reaction to viewed material were important from a market research standpoint. For example, the effectiveness of television commercials can be monitored by correlating the viewing of those commercials with the subsequent purchase activities of panelists whose viewing habits are being monitored. One prior art system for data gathering with particular utility in market research type applications is described in U.S. Pat. No. 4,546,382, issued on Oct. 8, 1985, to McKenna et al. (hereinafter "McKenna"). This patent describes a system that includes a plurality of remote units which are controlled from a central location. Each of the remote units is attached to a television receiver which is generally but not necessarily attached to a cable system. Each of the remote units can function to determine which of several television (hereinafter "TV") modes is in use, as well as to store TV channel selector data, data from an optical input device, and/or data input by viewers representative of the composition of the viewing audience. The data is stored either for later collection by a portable data collector, or for direct transmission to the central location by each of the remote units. A video message for a TV viewer (e.g., a survey question) may be transmitted from the central location and stored at the remote units for later display on the TV receiver associated with the remote units. In sum, a variety of well-known television-related metering devices and data collection systems can be placed in the household and, transparent to the occupants of the household, monitor TV channel changes, and viewing habits, accumulate time on a given channel and other information, and communicate the data gathered to a central location (e.g., server) using dedicated telephone lines.

Data collection systems, such as that described in McKenna have provided transparent mechanisms to collect TV-related usage data from households. However, increasingly in today's home environments, the occupants have, and interact with, a variety of other devices, such as computers, facsimile machines, modems, multi-line telephones and entertainment centers. Just as remotely accumulating data regarding the habits of television viewers is important from a market research standpoint, so is similar data which can be collected from these other devices. For example, computers equipped with high-speed modems allow individuals within the household to make a variety of purchases from electronic on-line services or to access various types of product or market data from electronic sources. From a market research standpoint, capturing data regarding such transactions is invaluable in order to market the product and/or services to the home.

It would therefore be desirable to provide a computer monitoring system which is capable of providing enhanced connectivity and desktop activity monitoring.

SUMMARY OF THE INVENTION

In particular, monitoring all the inbound and outbound information activity at the household level can provide important information regarding individual usage. For example, monitoring the real-time interaction between an on-line service and a household user can provide important information regarding the type of information being accessed or the time of day a particular service is accessed. Thus, the on-line service provider can customize certain offerings based upon data collected from the user base. Another type of user interaction which could be monitored is with the local personal computer (hereinafter "PC") and application software loaded on a particular PC. For example, when a user is actively running a particular application software, the type of information which could be collected would include: time of loading the software package, total usage time of the application, types of files accessed or types of functions accessed by the user. As the usage of various information devices becomes commonplace in the household, and such devices are used increasingly to interact with on-line services, it will be advantageous to provide a system which would allow for the collection of all information activity on a real-time basis.

An object of the present invention is thus to provide a system and method for the monitoring and collection of all inbound/outbound information activity and communications activity at a particular user location, for example, a household equipped with a variety of devices having communication capabilities. In accordance with an aspect of the present invention, the real-time interaction between a user and an external information service is monitored and specific data are collected regarding that real-time interaction. For example, when a user is connected to a commercial information service (e.g., CompuServe or Prodigy) connectivity data (e.g., date/time of interactive session, number of packets sent/received, application file name) are collected. In addition, other substantive data (e.g., type of service, type and number of inquiries made, etc.) regarding the real-time interaction are collected. The information is collected in real-time, on an operation-by-operation basis, and is ultimately aggregated, for example, at the household level in a central location within the household. The aggregated data is thereafter transmitted to a central server for data analysis purposes.

In accordance with the preferred embodiment of the invention, the information monitoring and collecting is facilitated by using a stub program module which inserts itself in the execution control flow between a target application (i.e., the application being monitored) and the functions (i.e., application program interface—API) that are being called. Advantageously, the insertion of the stub program module allows for the profiling of the real-time interaction between, for example, the user and the information service. The profiling is realized by capturing and logging specific network connectivity and substantive activity data. A so-called "trapping" technique is used to intercept function calls and messages received from, and transmitted to, the target program module. The trapping of all function calls allows for the complete logging and profiling of target module operations, and therefore provides the basis for profiling the real-time interaction between the user and the service.

In a preferred embodiment, the invention resides in a connectivity monitor and desktop activity monitor which comprise a set of client software modules, including executable files and virtual device drivers that capture and log targeted operating system modem connectivity and desktop activity data. The connectivity monitor includes a connectivity infiltration module (hereinafter "CIM") and a connectivity monitor interface program. The CIM functions as a stub module that monitors the bi-directional data stream at the virtual device driver level between software modules of the operating system. The connectivity monitor interface program communicates with the CIM to provide for the display, storage and transfer of data provided by the infiltration module. The CIM interacts with the communication subsystem of the client computer operating system. It utilizes the hooking functions provided by the operating system to set hooks for selected function calls from the application to the communications drivers. When hooked functions are accessed by an application being monitored, the CIM intercepts the data intended for the hooked function and passes that information to the connectivity monitor interface program.

The desktop activity monitor includes a desktop infiltration module and a desktop monitor interface program which monitor activity from the keyboard and pointing devices used to interface with the client computer. The infiltration module functions to set hooks to the operating system keyboard driver and intercepts appropriate function calls to the keyboard driver to monitor all keystroke information. The monitor interface program monitors the use and movement of the pointing device by periodically determining the pointing device location. The monitor interface program also takes a "snap shot" of the loaded and active applications in the client system to determine when new applications become active or inactive.

The invention provides the capability to monitor a number of attributes at the data stream level in a bidirectional, real-time fashion. With regard to the connectivity data monitor, such attributes include the phone number dialed, data packets sent, bytes sent, data packets received, bytes received, URL (Uniform Resource Locator sites) sites visited on the Internet, and the recognition of an outgoing fax call. With regard to the desktop activity monitor, such attributes include the length of time an application is active, resident in memory, inactive or suspended.

DETAILED DESCRIPTION OF THE PREFERRED EMBODIMENTS

Figure 1:
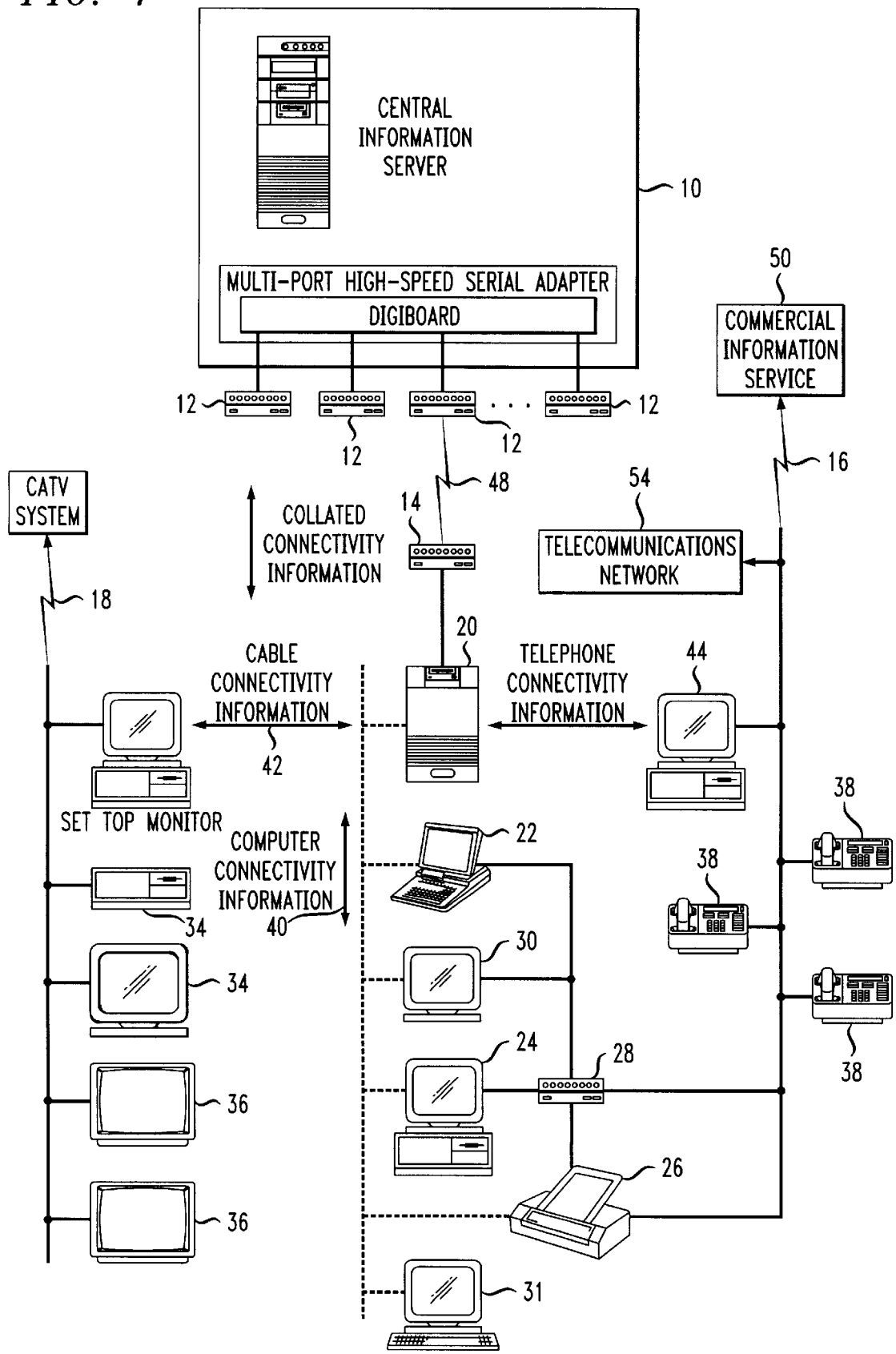
FIG. 1 is a diagram of an illustrative overall system in accordance with the present invention.

FIG. 1 shows an illustrative system employing the present invention. In the embodiment shown in FIG. 1, a central information collection server 10 communicates with a central information aggregator 20 located, for example, in a user's household. Communication between server 10 and aggregator 20 is facilitated by modems 12 and 14 which exchange data in a conventional manner over, for example, a POTS telephone connection supported by data communication medium 48. In accordance with an aspect of the present invention, aggregator 20 will collect inbound and outbound information regarding the activities of various hardware devices such as a laptop computer 22, personal computer 24, workstation 30, facsimile machine 26, information appliance 31, telephone 38, set top box 32, entertainment center 34 and television 36. These devices may, for example, be co-located within a single user household. The inbound and outbound activities being monitored include items such as on-line information service usage (e.g., Prodigy or CompuServe) and information regarding the facility used to engage the service (e.g., the Internet). In accordance with an aspect of the invention, the real-time interaction between a user and such a commercial on-line information service 50 is monitored to collect information such as, but not limited to, type of services accessed by the user, time spent using each individual service, type and quantity of information downloaded by user, the time of day the user logged on the service, total connect time and data exchange rate. Advantageously, this real-time information is periodically collected from the individual devices being monitored by aggregator 20 and sent to server 10 where the data is analyzed to indicate certain user trends.

In a similar fashion, information is collected regarding the user's interaction with a cable television system 52 (hereinafter "CATV") and a telecommunications network 54. CATV information collected includes items such as tuned channels, holding time for each channel, data connection, connect time, time of day and information uploaded. Telecommunications network 54 information collected includes items related to voice communication, for example, connect time, dialed outgoing telephone number, caller ID for incoming calls, time of day, holding time and connection status. In addition, facsimile communication such as dialed number, connect time, data rate, pages of information transmitted/received, time of day and connection status may be collected. Further, data communication information such as dialed number, connect time, data rate, modem setup, time of day and connection status may also be collected.

In typical personal computer systems, the interaction between a computer user and the commercial information service (e.g., CompuServe, Prodigy, electronic bulletin boards, services available over the Internet) is facilitated by certain application software. The application software provides certain mechanisms for user connectivity and interactivity with an on-line service. In accordance with the present embodiment, such interactivity and connectivity are accomplished, for example, in the well-known Windows v.3.1 operating system (from Microsoft Corporation) environment by using so-called calling and target program modules. As an example, a user executes an application program which provides the user interface (i.e., application program interface API) to the commercial information service. This application program is executed within the "calling" module and will employ the target module to complete the communication link with the information service. In this example, the target module provides the communication drivers to establish and maintain a data connection between the user's personal computer and the information service. No mechanism, however, is provided in such a system to capture any substantive information regarding the actual real-time interactive session between the user and the information service. Program modules establish the appropriate connections and provide the required user interface for the user to effectively use the service, but do not monitor the information activity across the interface for data collection purposes.

By contrast, in accordance with the preferred embodiment, the real-time interaction between the user and the on-line information service is monitored and select information is collected in regard to the interactive session. We have realized that the monitoring of the real-time interaction can be accomplished using a software infiltration technique. Software infiltration analysis occurs at run-time and captures certain information regarding the operation and activities of software application programs. In accordance with the preferred embodiment, infiltration is accomplished by using a stub program module which inserts itself in the execution control flow between a target application and the functions that are being called from the calling module.

Figure 2:
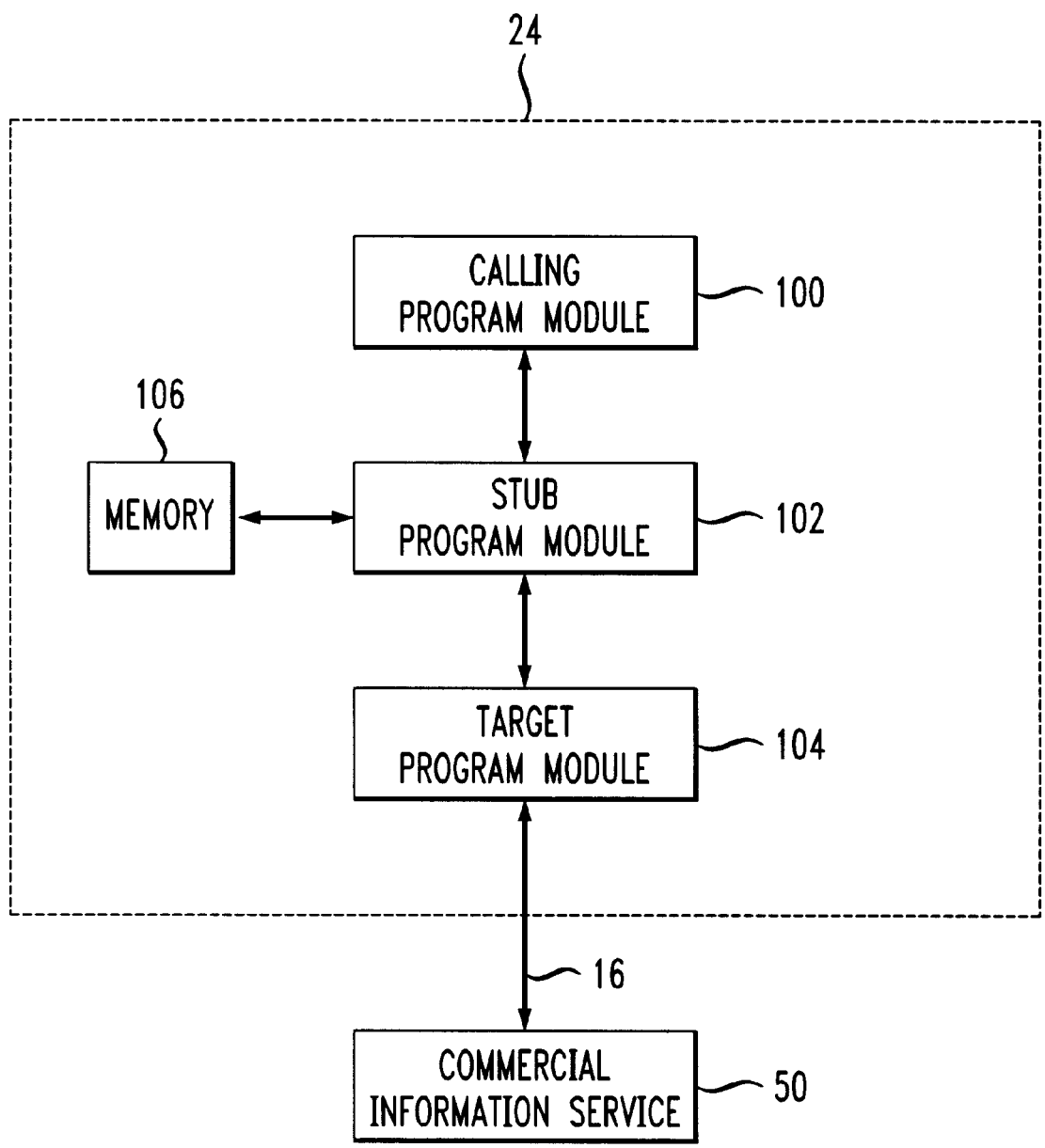
FIG. 2 is a block diagram of an illustrative embodiment for monitoring and collecting information in the system of FIG. 1.

More particularly, FIG. 2 illustrates an embodiment of the present invention wherein a connection between, for example, personal computer 24 and the source of the commercial information service 50 is established via data communication medium 16. As will be appreciated by those skilled in the art, the description and details contained herein pertaining to personal computer 24 are equally applicable to other devices having communication capabilities (e.g., laptop 22, workstation 31, facsimile 26 shown in FIG. 1). The user employs personal computer 24 to interact with information service 50 and it is this interaction which is advantageously monitored in accordance with the present invention. As shown, calling program module 100, stub program module 102, target program module 104 and memory 106 all reside within PC 24. Calling program module 100 is used to execute the application program which will provide the functions to the user for interacting with service 50. Stub program module 102 is loaded and placed in the execution control flow between calling program module 100 and target program module 104. Target program module 104 contains the software drivers, in this example modem drivers, needed to establish the connection across data communication medium 16 between PC 24 and information service 50. The manner in which stub program module 102 is loaded by PC 24 will be discussed below.

Advantageously, the insertion of stub program module 102 allows for the profiling of the real-time interaction between the user (via PC 24) and information service 50. The profiling is realized by capturing and logging specific network connectivity and substantive activity data. A so-called "trapping" technique is used to intercept API function calls and messages received from, and transmitted to, target program module 104. The trapping of all function calls allows for the complete logging and profiling of target program module operations, and therefore provides the basis for profiling the real-time interaction between the user and information service 50. In accordance with the embodiment, the function calls and messages are trapped by employing the so-called "loading software stub" technique.

The basic premise of "loading" is that a function call (i.e., call supplied by API of calling program module 100) is intercepted between the source of the call (i.e., API) and the destination of the call (i.e., target program module 104). In accordance with the disclosed embodiment, stub program module 102 is written as a dynamic link library (hereinafter "DLL") in the Windows v.3.1 operating system. A DLL is a library of shared functions that individual applications link to at run-time as opposed to compile time. Advantageously, by constructing the stub program module as a DLL, it can be constructed for any target program module without requiring the modification of any target module source code.

Thus, in accordance with the disclosed embodiment, stub program module 102 is loaded by the Windows operating system loader at runtime. Stub program module 102 is configured in such a way that it imports target program module 104 which is accomplished by the demand loading of target program module 104 by the Windows operating system. Stub program module 102 is further configured to carry the name of target program module 104 to facilitate the interception of function calls. For example, in the embodiment, calling program module 100 sends a function call in response to a user input for receiving certain information from information service 50 (e.g., user selects a particular software icon presented by application program). This function call, unbeknownst to calling program module 100, is intercepted by stub program module 102 which captures the function call and associated parameter data, and then passes the function call to target program module 104 as originally intended by calling program module 100. Similarly, stub program module 102 collects function calls and associated parameter data transmitted from target program module 104 to calling program module 100. Therefore, the operation of stub program module 102 is transparent to both calling program module 100 and target program module 104.

In accordance with this embodiment, the information collected by stub program module 102 with regard to the real-time interaction between the user and information service 50 is stored in local memory 106 of PC 24. Illustratively, connectivity data (e.g., date/time of interactive session, number of packets sent/received, application file name) and substantive data regarding the real-time interaction (e.g., type of service, and number of inquiries made) are stored in a series of "flat" data structures.

Again illustratively, in a further embodiment of the present invention, Uniform Resource Locator (hereinafter "URL") information is collected by stub program module 102 during user connections to the Internet and, in particular, the well-known World Wide Web (hereinafter "WWW"). The well-known URL's are employed when using the WWW for identifying particular resources (e.g., information services) associated with the URL's (typically a one-line address associated with each resource). That is, the WWW uses URL's to locate particular resources across the entire Internet. In accordance with this embodiment, the URL information is captured as binary data or ASCII text. Due to the transmission characteristics associated with the Internet, this captured binary data or ASCII text contains both the URL and other, extraneous characters. The extraneous characters must be removed for the correct identification of the URL. Thus, in accordance with this embodiment, a filter is applied to the binary data or ASCII text to search for the URL string components which are known to be in the form, for example, "scheme://site address/pathname/filename". The captured URL is then stored in a data structure as described above.

Upon completion of the interactive session, the data structures are transferred to a set of connectivity session files. These files are named, illustratively, by the date of the session and are indexed by the number of the session for a particular day. Periodically, the files saved in memory 106 are uploaded to aggregator 20 (see FIG. 1) which aggregates information from all the hardware devices being monitored. Thereafter, aggregator 20 sends the information to server 10 via data communication medium 48, for example, on a periodic (e.g., once a day) or polled basis. As will be appreciated by those skilled in the art, the functionality and services provided by aggregator 20 may also be supplied, for example, by PC 24, thereby eliminating the need for a dedicated piece of computer hardware used for server purposes only.

Figure 3:
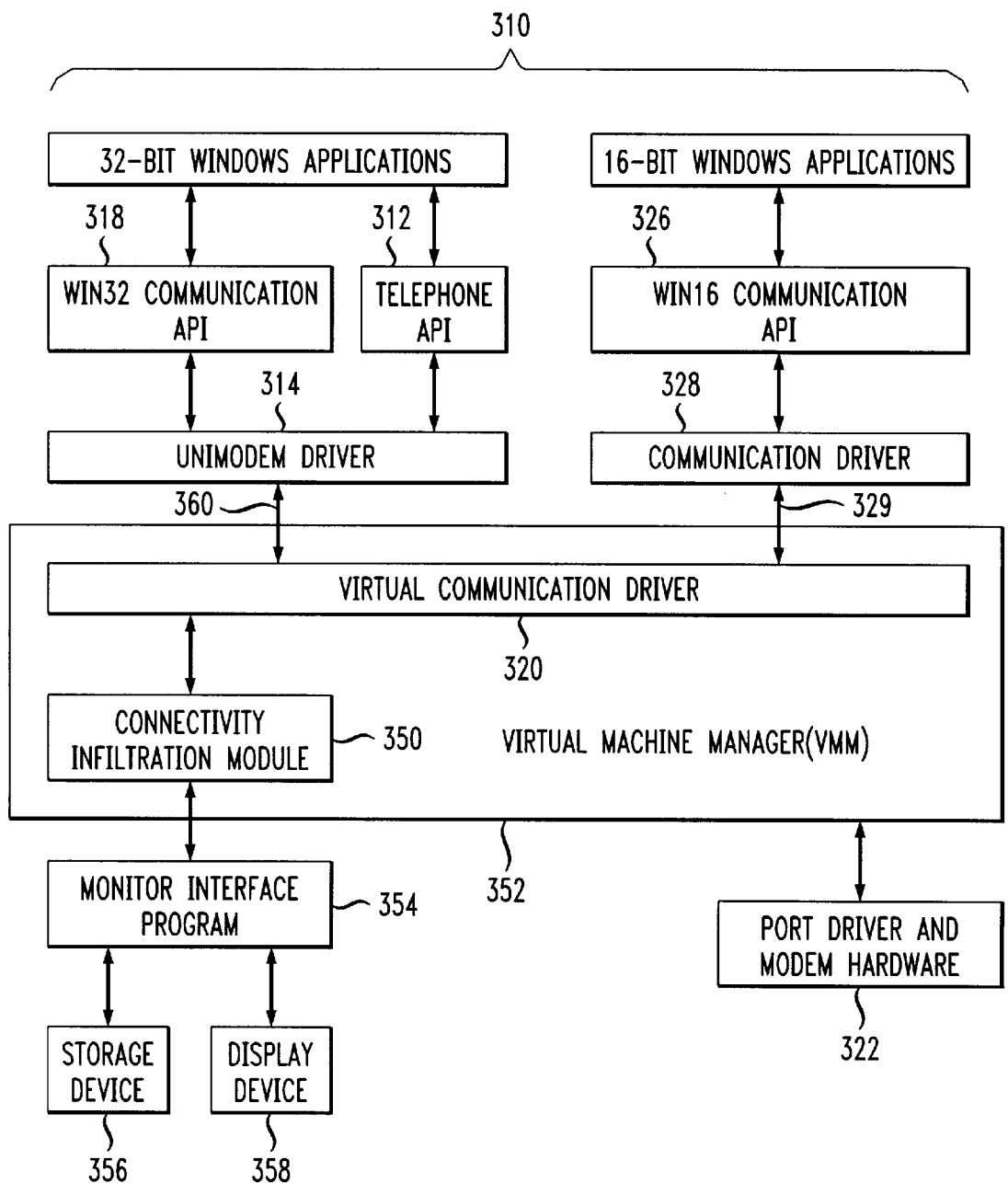
FIG. 3 is a block diagram of an illustrative embodiment for monitoring and collecting information according to another preferred embodiment of the present invention.

Referring to FIG. 3, there are illustrated the primary elements of a preferred embodiment of the present invention in a Windows-based operating system. A number of applications, represented by element 310, may be resident in memory at any time as is typical of multitasking operating systems. The Telephony Application Programming Interface (TAPI) module 312 provides a device independent interface for applications to control a modem. The TAPI module 312 may be a dynamic linked library (DLL). It may be called by applications 310 and supports modem control functions such as dialing an outbound call, waiting for inbound calls of a particular type, answering inbound calls, hanging up current calls, etc. The TAPI module 312 routes application function calls to a unimodem device 314.

In the Windows-based operating system, applications make function calls to a communication application programming interface Win32 Comm API 318 to configure a modem and to perform data I/O through it. The modules supporting the Win32 Comm API 318 in the modem subsystem include the virtual communication (VCOMM) driver 320. The VCOMM driver 320 is a ring 0 level virtual device that manages all access to communication resources in the system. These "communication resources" include physical or logical devices that provide a single asynchronous data stream. Serial ports, parallel ports, and modems are examples of communication resources.

State-of-the-art Windows-based operating systems provide for the execution of 16-Bit as well as 32-Bit applications. Accordingly, a number of 16-Bit applications, represented by element 310 may be resident in memory. A 16-Bit Communications Application Program Interface (Win16 Comm API) 326 provides an interface to allow 16-bit applications to access modems and other serial communications devices. An operating system driver COMM.DRV 328 provides a 16-bit AT command set independent interface to serial communications services (i.e., fax, data and voice).

All data to and from 32-bit communications applications passes through the Win32 API layer 318. All 32-bit command and control data to and from applications passes through the TAPI 312 and Win32 Comm API layer 318. This data and control information is routed through the Unimodem driver 314 to the VCOMM driver 320. All data, command and control to and from 16-bit communications applications passes through the Win16 Comm API layer 326. The information stream is routed through the COMM.DRV device driver 328 and then passes to the VCOMM driver 320. In the VCOMM driver 320, all data and control commands are combined into a single information stream. The information stream is then routed to the port driver and modem hardware 322.

In accordance with a preferred embodiment of the present invention, a connectivity infiltration module (CIM) 350 is constructed as a virtual device driver and made a part of the Virtual Machine Manager (VMM) 352. CIM 350 communicates with a connectivity monitor interface program 354 which is an executable program that facilitates the storage of collected data to a storage device 356, i.e., disk drive, and display of data to a user on display device 358. As a part of the VMM 352, infiltration module 350 is adapted to intercept the bi-directional data stream 360 occurring between unimodem driver 314 and VCOMM driver 320 and the bi-directional data stream 329 for 16-bit applications occurring between Comm.drv 328 and VCOMM driver 320, in a manner that will be described below.

The technique employed according to a preferred embodiment of the present invention for infiltration of the data stream described above is the technique of "hooking". Hooking function calls and messages and monitoring the information of interest allows for the complete logging and profiling of target module operations. Information such as date and time of function calls, parameters passed with function calls, number calls, duration and frequency of calls can be profiled.

In the well-known Microsoft Windows operating system, at the virtual device driver level, function calls/messages are hooked by a service that is provided by the operating system's virtual machine manager (VMM). The machine manager provides a system-wide service called HOOK_DEVICE_SERVICE. Using this service, a virtual device driver infiltration module can intercept function calls in any virtual device driver and redirect the function call and any included information to another target. According to the present invention, the infiltration module places a call to HOOK_DEVICE_SERVICE for every function call desired to be "hooked" or monitored. When the infiltration module is loaded and initialized, the hooking calls are executed and the hooks are registered in the VMM's registry. When calls to the targeted functions are made by applications, the calls are directed to the infiltration module, which can then extract parameters and data and then pass on the function call to the original target function.

The VCOMM driver in the Windows operating system is a driver through which all communications from 32-bit and 16-bit subsystems pass. In addition, all application calls made through telephony, messaging and communication API pass through the VCOMM driver. Thus, all communications functions of interest in monitoring connectivity data are contained and exposed in the VCOMM driver.

According to the present invention, the connectivity monitor is composed of two main modules. One module is the CIM. The other is the connectivity monitor interface program. The VCOMM driver is part of the VMM which is a collection of virtual device drivers that are loaded up during initialization of the operating system. The VCOMM driver 320 is a dynamically loadable driver component. The CIM 350 is a virtual device driver module. All command, control and data is intercepted and monitored within the VCOMM driver component.

The CIM performs four main functions: 1) setting and releasing the service hooks through HOOK_DEVICE_SERVICE; 2) capturing command and control information; 3) buffering connectivity data; and 4) passing information to and from the monitor interface program. The infiltration module uses the HOOK_DEVICE_SERVICE to set and release hooks to all the communication function of interest. The command, control and session information is monitored by intercepting the VCOMM functions defined in Table 1 below.

TABLE 1

| VCOMM Function Name | Function |
| --- | --- |
| OpenComm | Open a communications session using a virtual machine identifier. Connects to a communication port. |
| Close Comm | Releases the communications resource and port. |
| GetCommState | Gets the settings and status for a communications session. |
| GetLastError | Gets last communication error for a given session. |
| GetModemStatus | Gets setting and status for the modem. |

Data information is monitored by intercepting the VCOMM functions defined in Table 2 below.

TABLE 2

| VCOMM Function Name | Function |
| --- | --- |
| ReadComm | Reads a specified number of bytes of data from the specified communication port. |
| WriteComm | Writes a specified number of bytes of data to the specified communication port. |

The call to HOOK_DEVICE_SERVICE performs two essential tasks. First, it sets the hook for the target function call (in this example VCOMM_OpenComm) and routes the calls to the infiltration function MyVCOMM_OpenComm. Second, it renames the entry point of the target function (in this example the new name of the entry point for VCOMM_OpenComm is TheRealVCOMM_OpenComm).

```
TheRealVCOMM_OpenComm = Hook_Device_Service_C
    (_VCOMM_OpenComm, MyVCOMM_OpenComm, &ocThunk)
```

After the hooks have been set, any calls to the hooked target functions will be routed to the infiltration function. For example, calls to the target function VCOMM_OpenComm will be routed to MyVCOMM_OpenComm. After the information of interest has been extracted and logged, the call is passed on to the new entry point for the original function:

```
PVOID MyVCOMM_OpenComm(PCHAR szPortName, VMHANDLE Vmid)
    <body of the function>
return = (COMMPORTHANDLE) The RealVCOMM_OpenComm
(zPortName, Vmid);
```

For each individual communication session, the start and stop time and date is recorded. The session duration is also calculated. For each communication session, all transmit and receive data is captured and monitored. The number of bytes and packets sent and received during the session is recorded. Transmit data may be copied, for example, to a set of 8192 byte buffers. When one buffer fills up, the data is transferred to the monitor interface program for collation and analysis.

The infiltration module holds the mechanism that allows the communication between the virtual device driver infiltration module and the application level monitor interface program. To establish this communication, first the monitor interface program obtains a handle to the infiltration module by:

```
HANDLE Hdevice = CreateFile(\\\\.\\<name of infiltration module>,
0,0,0,CREATE_NEW, FILE_FLAG_DELETE_ON_CLOSE,0);
```

Once the infiltration module has been loaded, the monitor interface program can make calls to the infiltration module by using:

```
BOOL DeviceIoControl(hDevice,<event ID>, inBuf, sizeof
(PVOID),(LPVOID)RetInfo, sizeof(RetInfo), &cbBytesReturned, NULL)
```

This call will provide a valid pointer to a common structure that can be accessed by both the infiltration module and the monitor interface program. Using this structure, appropriate signaling, data and information can be passed between the infiltration module and the monitor interface program.

The infiltration module is loaded and initialized by the monitor interface program. Upon initialization, the infiltration module allocates data structures and buffers and establishes communication with the monitor interface program. Once communication is established, the infiltration module sets the hooks for the VCOMM functions of interest: OpenComm, CloseComm, GetCommState, GetLastError, ReadComm, WriteComm.

When an application requests a modem connection, an OpenComm call is captured by the infiltration module. The infiltration module resets all data buffers and structures and then notifies the monitor interface program that a new communication session has been requested. The monitor interface program opens and initializes buffers and data structures and creates and opens files to hold the session data. During the connectivity session, raw transmit and received data is collected in real-time by the infiltration module. Transmit data is copied and stored in a set of data buffers. When one of the transmit buffers fills up, it is copied to disk. During this transfer operation, the ongoing modem transmit data is copied to the alternate transmit data buffer.

Upon application termination of a modem connection, the infiltration module captures a Close_Comm call. The infiltration module writes out all data buffers and structures and then notifies the monitor interface program. Upon closure of the communications session, all connectivity data (data and time of session, number of data packets sent and received, application file name) and substantive data regarding the real-time interaction (contents of the data buffer) are written to the session data file. The information collected by the connectivity monitor with regard to the real-time interaction between the user and information service (50, FIG. 1) is stored in the local memory (106, FIG. 2 and 356, FIG. 3) of the PC (24, FIG. 1). For example, session information files are named by date of session and are indexed by the number of the session for a particular day. The invention also contemplates providing for user-adjustment of the default number of bits captured in the bidirectional data stream. Such setting for specifying the size of the contents of the data buffer (written to the session data file) can be set in the initialization file for the connectivity monitor interface program (C:\WINDOWS\ECL.INI).

The following is an example of an entry in a session data file created by the connectivity activity monitor in accordance with a preferred embodiment of the present invention, with each data field and the corresponding entry in the session data file being explained in Table 3 below:

TABLE 3

11002,011,ATDT5664798 . . . ATZ,
C:\PROGRAM
FILES\NETSCAPE\NAVIGATOR\PROGRAM\NETSCAPE.EXE,
04/29/97,02:49:36,04/29/97,04:32:10,7,90,72,72

| Data Field | Entry |
|---|---|
| Household ID | 11002 |
| Customer Premises E[001b]quipment ID | 011 |
| Contents of Data Buffer (512 bytes) | ATDT5664798 . . . ATZ |
| Application File Name | C:\PROGRAMFILES\NETSCAPE\NAVIGATOR\PROGRAM\NETSCAPE.EXE |
| Date Opened | 04/29/97 |
| Time Opened | 02:49:36 |
| Date Closed | 04/29/97 |
| Time Closed | 04:32:10 |
| Packets Sent | 7 |
| Bytes Sent | 90 |
| Packets Received | 72 |
| Bytes Received | 72 |

It will be recognized that the phone number dialed above may be extracted from the modem transmit buffer (Data Buffer) which may have a default size of 512 bytes and which may contain various modem commands. Typically, the phone number will be preceded by the modem commands ATDT. Thus, the connectivity monitor may extract the phone number dialed by recognizing the ATDT modem command and storing the number that follows that command.

In accordance with another aspect of the invention, an outbound fax call may be recognized from the data in the modem transmit buffer (Data Buffer). Such recognition would be triggered by the interception of the modem commands signaling an outbound fax, for example, the string "FCLASS=" in the modem command string. If the Application Name is a well-known fax software program, then fax recognition may be possible for both outgoing and incoming faxes.

In accordance with another aspect of the invention, the connectivity monitor is also capable of using provided routines when a call represents a facsimile transmission by recognizing the handshaking that occurs during a facsimile transmission.

It will be recognized that the URL visited during connections to the Internet may be extracted from the modem transmit buffer. The URL information is collected by the connectivity monitor during user connections to the Internet and captured as a string of binary data or ASCII text, for example. The binary data or ASCII text may contain extraneous characters which would need to be removed for correct identification of the URL. For this reason, a suitable data filtering method may be applied to the binary data or ASCII text to search for the URL string, which has the form, for example, "scheme//site/address/pathname/filename." The filtered URL is then stored in a data structure.

The phone number dialed, the URL visited during Internet connections and the fax flag determining fax detection can all be measured in real time by the connectivity monitor or by subsequent extraction from the Data Buffer.

In accordance with another aspect of the invention, the amount and level of data transfers, for example, the peak and average data transfer rates during a communication session, may be determined. Data transfer levels are obtained, for example, by selecting a predetermined time interval within which to monitor data transfer. The peak value may be determined by monitoring the peak data transfer rate within the time interval. The average data transfer rate may be calculated by determining the time average over the predetermined time interval.

According to another aspect of the invention, the level of user-transparency of the connectivity monitor interface program may be adjusted such that the connectivity monitor interface program may be completely hidden from the user, may be minimized on the desktop or maximized. Such settings can be selected in the initialization file for the connectivity monitor interface program (C:\WINDOWS\ECL.\FNI).

It will be recognized by those of ordinary skill that the present invention provides a means for capturing the bitstream en route to or from the modem. Thus, connectivity monitoring occurs at the virtual device level to monitor the actual data being sent to or being received from the modem. Moreover, through appropriate filtering of the captured data, various information may be monitored and stored for later retrieval or upload to an aggregator to determine connectivity demographics among a large group of users.

The desktop activity monitor is a set of resident software modules, including executable files and virtual device drivers that will capture and log the usage and activity of desktop applications. For each active application, a data structure is created to store and log activity and usage data. This data includes time and date of loading and unloading of the applications, usage information (time that the application is in-focus, active, and suspended), some indication of the level of activity, files used and accessed, and other selected metrics.

Desktop activity is monitored by capturing key strokes and monitoring movement and use of the mouse or pointing device. The desktop activity monitor according to the present invention is capable of determining and storing the length of time that an application is active. In a Windows environment, an application is considered active if it is in focus and keyboard and/or mouse activity is detected. The desktop activity monitor is also capable of determining and storing the length of time that an application is suspended. An application is considered suspended if it is in focus, but no keyboard or mouse activity has occurred for a predetermined period of time. The desktop activity monitor according to the present invention is also capable of determining the length of time a program is inactive. An application is considered inactive when it is minimized or out of focus. Finally, the desktop activity monitor is also capable of determining the length of time that an application resides in memory. In accordance with the invention, the desktop activity monitor is provided with routines to permit a user to adjust the idle time allowed before desktop activity is deemed to be suspended or inactive by the desktop activity monitor. Such settings can be set in the initialization file (C:\WINDOWS\ECL.INI).

The desktop activity monitor software includes a desktop infiltration module and a desktop monitor interface program which monitor activity from the keyboard and pointing devices used to interface with the client computer. The infiltration module functions to set hooks to the operating system keyboard driver and intercepts appropriate function calls to the keyboard driver to monitor all keystroke information. The monitor interface program monitors the use and movement of the pointing device by periodically determining the pointing device location. The monitor interface program also takes a "snap shot" of the loaded and active applications in the client system to determine when new applications become active or inactive.

In a fashion similar to the way the connectivity monitor infiltrates the communications subsystem, the use of the keyboard is determined by hooking function calls to the keyboard driver and counting the number of keystrokes entered during a selected period of time. The movement and use of the pointing device is determined by monitoring the location of the mouse and determining if there has been any movement of the pointing device during a selected period of time.

The desktop infiltration module infiltrates the operating system by hooking calls to the keyboard driver, in the case of Windows 95, the Win32 Virtual Keyboard Driver (VKD). This device driver is part of the Virtual Machine Manager (VMM) which is a collection of virtual device drivers that are loaded up during boot up of the operating system. The VKD handles all keyboard input/output.

The desktop infiltration module uses the HOOK_DEVICE_SERVICE to set and release hooks to the keyboard driver. Intercepting the following VKD function monitors all keystroke information:

VKD_Filter_Keyboard_Input

The desktop infiltration module is loaded and initialized by the monitor interface program. Upon initialization, the infiltration module sets the hooks for the VKD function of interest: VKD_Filter_Keyboard_Input.

The desktop monitor interface program monitors the use and movement of the pointing device by issuing function calls to the Win32API GetMessagePos, which returns the absolute (x,y) screen coordinates of the mouse pointing device. The mouse position is periodically queried by the monitor interface program to determine if there has been any movement of the pointing device during a specified time interval.

When the monitor interface program is loaded, it sets up and allocates data buffers and records for storing application activity data in memory, creates files for storing application activity data on disk and initializes and loads the infiltration module. Upon loading, the monitor interface program builds sets of records for the programs/applications that are currently loaded on the computer system. At set intervals, the monitor interface program takes a snapshot of the current list of loaded and active programs in the system. A handle to the snapshot of the current list of loaded programs is obtained by a call to the Win32 Toolhelp API:

hSnapShot=CreateToolhelp32Snapshot (TH32CS_SNAPPROCESS,0)

The current application list is compared to the previous application list to determine if any applications have been added or removed. If an application has been added (loaded), a new record is created to hold the application's activity information and the record is added to the "active applications record list". If an application has been removed (unloaded) then the applications activity record is updated, the record is transferred to disk, and the entry is removed from the active application records list.

When keystrokes are received, the infiltration module increments the keystroke counters and then passes the keystroke data to the target keyboard device driver. The keystroke counter is periodically polled by the monitor interface program to determine if there has been any keyboard activity during a specified interval of time.

A timer may be used to monitor the state of the active (in-focus) application. If an in-focus application has not received a keystroke or mouse movement for a long period of time, for example, 60 seconds, the applications status is changed from active to suspended. When the status of an application changes, the status data in the applications activity record is updated. The idle time settings can be set in the initialization file for the desktop monitor interface program (C:\WINDOWS\ECL.INI). Preferably, the desktop activity monitor is provided with a user-interface which permits adjustment of the maximum allowable idle time. When the computer system is shut down, all application activity records are updated, the records are transferred to files on disk, and then the files are closed.

The following is an example of an entry in a session data file created by the desktop activity monitor in accordance with a preferred embodiment of the invention, with each data field and the corresponding entry in the session data file being explained in Table 4 below:

TABLE 4

11002,011,
C:\WINDOWS\SYSTEM\3DPIPES.SCR,
02/24/98,00:00:48,02/24/98,11:39:26,62,42183,0,42245,
C:\MIST/BIN/RUNTIME.EXE,
02/24/98,11:41:56,02/24/98,11:42:16,15,0,4,19

| Field Name | Value |
|---|---|
| Household ID | 11002 |
| Customer Premises Equipment ID | 011 |
| Application File Name | C:\WINDOWS\SYSTEM\3DPIPES.SCR |
| Date Open | 02/24/98 |
| Time Open | 00:00:48 |
| Date Closed | 02/24/98 |
| Time Closed | 11:39:26 |
| Length Active | 62 |
| Length Suspended | 42183 |
| Length Inactive | 0 |
| Length in Memory | 42245 |
| Application File Name | C:\MIST\BIN\RUNTIME.EXE |
| Date Open | 02/24/98 |
| Time Open | 11:41:56 |
| Date Closed | 02/24/98 |
| Time Closed | 11:42:16 |
| Length Active | 15 |
| Length Suspended | 0 |
| Length Inactive | 4 |
| Length in Memory | 19 |

It will be recognized that the above Table 4 represents data for multiple applications which may all be resident in memory at one time.

According to an aspect of the invention, the level of user-transparency of the desktop monitor interface program may be adjusted such that the monitor may be completely hidden from the user, may be minimized on the desktop or maximized. Such settings can be selected in the initialization file for the desktop monitor interface program (C:\WINDOWS\ECL.INI).

The foregoing merely illustrates the principles of the present invention. Those skilled in the art will be able to devise numerous alternative arrangements which, although not explicitly shown or described herein, embody those principles and are thus within the spirit and scope of the invention as defined in the appended claims.

What is claimed is:

1. An information monitoring and collection system comprising:
   a computer, including a communications subsystem for establishing a data connection between the computer and at least one device; the communication subsystem including a driver for facilitating a bi-directional data stream between the communication subsystem and the device; and
   a connectivity monitor adapted to monitor and collect data from the bi-directional data stream.

2. The information monitoring and collection system of claim 1, wherein the connectivity monitor further comprises an infiltration module constructed as a virtual device driver to intercept data in the bi-directional data stream.

3. The information monitoring and collection system of claim 2, wherein the communications subsystem further comprises a communications driver providing a plurality of functions that may be called in response to data in the bi-directional data stream and wherein the infiltration module includes means for intercepting calls to the communications driver functions.

4. The information monitoring and collection system of claim 3, wherein the means for intercepting calls to the communications driver functions includes a corresponding number of hooks for passing function calls to the infiltration module.

5. The information monitoring and collection system of claim 2, wherein the connectivity monitor further comprises a monitor interface program for facilitating the storage and display of data monitored by the infiltration module.

6. The information monitoring and collection system of claim 5, wherein the level of user-transparency of the monitor interface program may be adjusted.

7. The information monitoring and collection system of claim 5, wherein the connectivity monitor further comprises means for later analyzing the monitored data to determine attributes of the data.

8. The information monitoring and collection system of claim 5, wherein the user is permitted to adjust the size of a transmit buffer for storing the intercepted data.

9. The information monitoring and collection system of claim 5, wherein the monitor interface program includes means for recognizing a representation of a facsimile transmission.

10. The information monitoring and collection system of claim 5, wherein the monitor interface program includes means for recognizing a representation of a telephone number dialed by the modem.

11. The information monitoring and collection system of claim 5, wherein the monitor interface program includes means for recognizing a representation of the Uniform Resource Locators accessed by the user.

12. The information monitoring and collection system of claim 5, wherein the monitor interface program includes means for determining the peak and average values of data transmission occurring in the bi-directional data stream.

13. The information monitoring and collection system of claim 1, further comprising a desktop activity monitor for monitoring user and application activity on the computer.

14. The information monitoring and collection system of claim 13, wherein the desktop activity monitor includes a desktop infiltration module adapted to intercept desktop activity data from a user input device.

15. The information monitoring and collection system of claim 14, wherein the desktop infiltration module is constructed as a virtual device driver adapted to hook function calls to a user input device driver.

16. The information monitoring and collection system of claim 13, further including a desktop monitor interface program for facilitating the storage and display of desktop activity data.

17. The information monitoring and collection system of claim 16, wherein the desktop monitor interface program includes means to intercept desktop activity data from a user input device.

18. The information monitoring and collection system of claim 16, wherein the desktop monitor interface program includes means for periodically determining the names of loaded and active programs in the computer.

19. The information monitoring and collection system of claim 16, wherein the desktop monitor interface program includes means for determining when activity of an application has been suspended for a predetermined amount of time.

20. The information monitoring and collection system of claim 19, wherein the desktop monitor interface program further includes means for permitting the user to adjust the predetermined amount of time.

21. The information monitoring and collection system of claim 16, wherein the desktop monitor interface program includes means for permitting adjustment of the user transparency of the desktop monitor interface program.

22. A method of monitoring and collecting information in a computer system having a communications subsystem, the method comprising the steps of:
   establishing a data connection between the computer and at least one device in such a manner as to provide a bi-directional data stream within the communications subsystem;
   providing an infiltration module adapted to intercept the bi-directional data stream within the communications system;
   intercepting data in the bi-directional data stream with the infiltration module;
   filtering and collating the intercepted data using a monitor interface program; and
   storing the filtered and collated data in a storage device.

23. The method of claim 22, further comprising the step of later analyzing the data to determine attributes of the data.

24. The method of claim 22, wherein the step of intercepting data further comprises the step of setting at least one hook to intercept a function call represented in the bi-directional data stream.

25. The method of claim 22, wherein the step of intercepting data further comprises intercepting a function call to a virtual device driver.

26. The method of claim 22, wherein the step of providing an infiltration module further comprises the step of constructing a virtual device driver.

27. The method of claim 22, further comprising the step of providing a desktop activity monitor for monitoring application and user activity.

28. The method of claim 22, wherein the step of filtering and collating data further comprise the step of determining peak and average values of data transmission.

29. The method of claim 22, further comprising the step of uploading the filtered and collated data to an aggregator.

30. The method of claim 22, further comprising the step of determining from the intercepted data a representation of a facsimile transmission.

31. The method of claim 22, further comprising the step of determining from the intercepted data a representation of a Uniform Resource Locator.

32. The method of claim 22, further comprising the step of determining from the intercepted data a representation of a phone number dialed by a modem.

33. The method of claim 22, further comprising the step of permitting a user to adjust the size of a transmit buffer for storing the intercepted data.

34. The method of claim 22, further comprising the step of permitting a user to adjust the level of user-transparency of the monitor interface program.

35. A method of monitoring and collecting information in a computer system having a desktop user interface and a user input device, the method comprising the steps of:

provinding an infiltration module adapted to monitor activity on the desktop user interface;

monitoring the desktop activity of the user by intercepting commands from the user input device to the computer;

filtering and collating the intercepted data using a monitor interface program; and storing the filtered and collated data in a storage device.

36. The method of claim 35, further comprising the step of constructing the desktop infiltration module as a virtual device driver adapted to hook function calls to a user input device driver.

37. The method of claim 35, further comprising the step of facilitating the storage and display of desktop activity data using the desktop monitor interface program.

38. The method of claim 35, further comprising the step of intercepting desktop activity data from a user input device using the desktop monitor interface program.

39. The method of claim 35, further comprising the step of periodically determining the names of loaded and active programs in the computer using the desktop monitor interface program.

40. The method of claim 35, further comprising the step of determining when activity of an application has been suspended for a predetermined amount of time using the desktop monitor interface program.

41. The method of claim 40, further comprising the step of permitting the user to adjust the predetermined amount of time.

42. The method of claim 35, further comprising the step of adjusting the level of user-transparency of the monitor interface program.

43. The method of claim 35, further comprising the step of later analyzing the data to determine attributes of the data.

* * * * *